F. W. PAWLING.
GLASS WORKING MACHINE.
APPLICATION FILED JUNE 14, 1915.
1,177,135.
Patented Mar. 28, 1916.
2 SHEETS—SHEET 1.
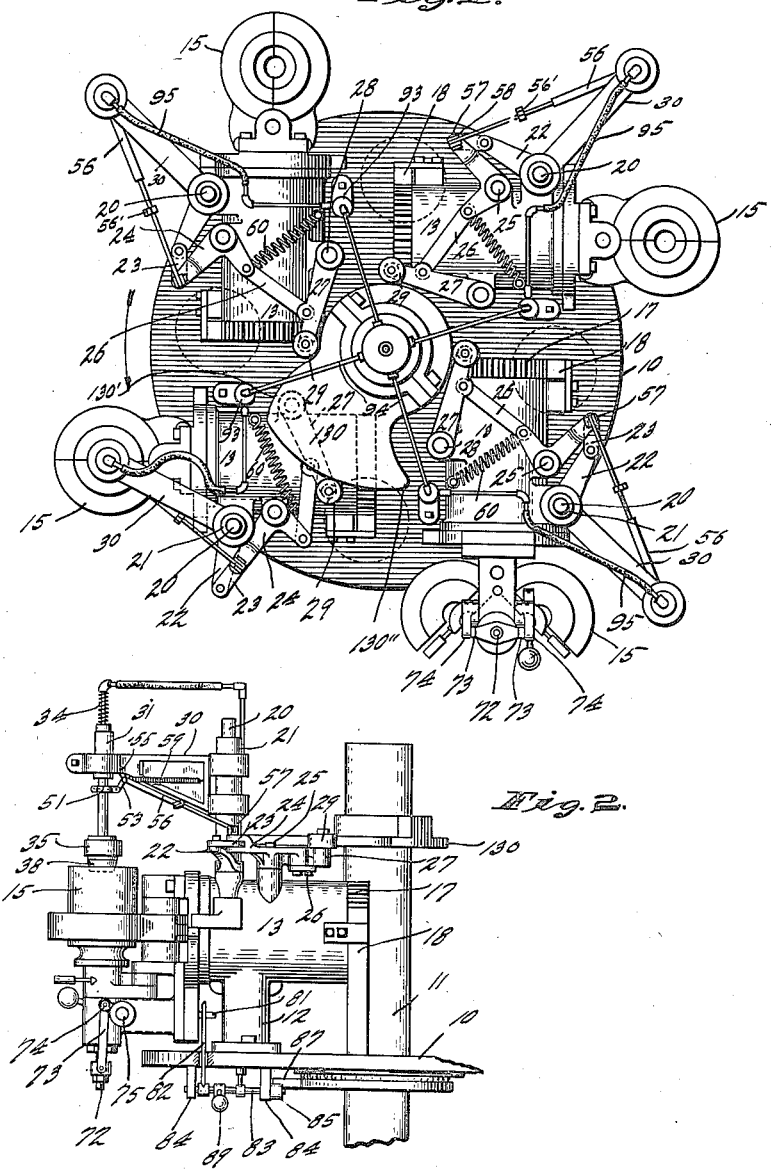
Witness
Frank A. Fahle
Inventor
Francis W. Pawling,
By Hood & Achly.
Attorneys

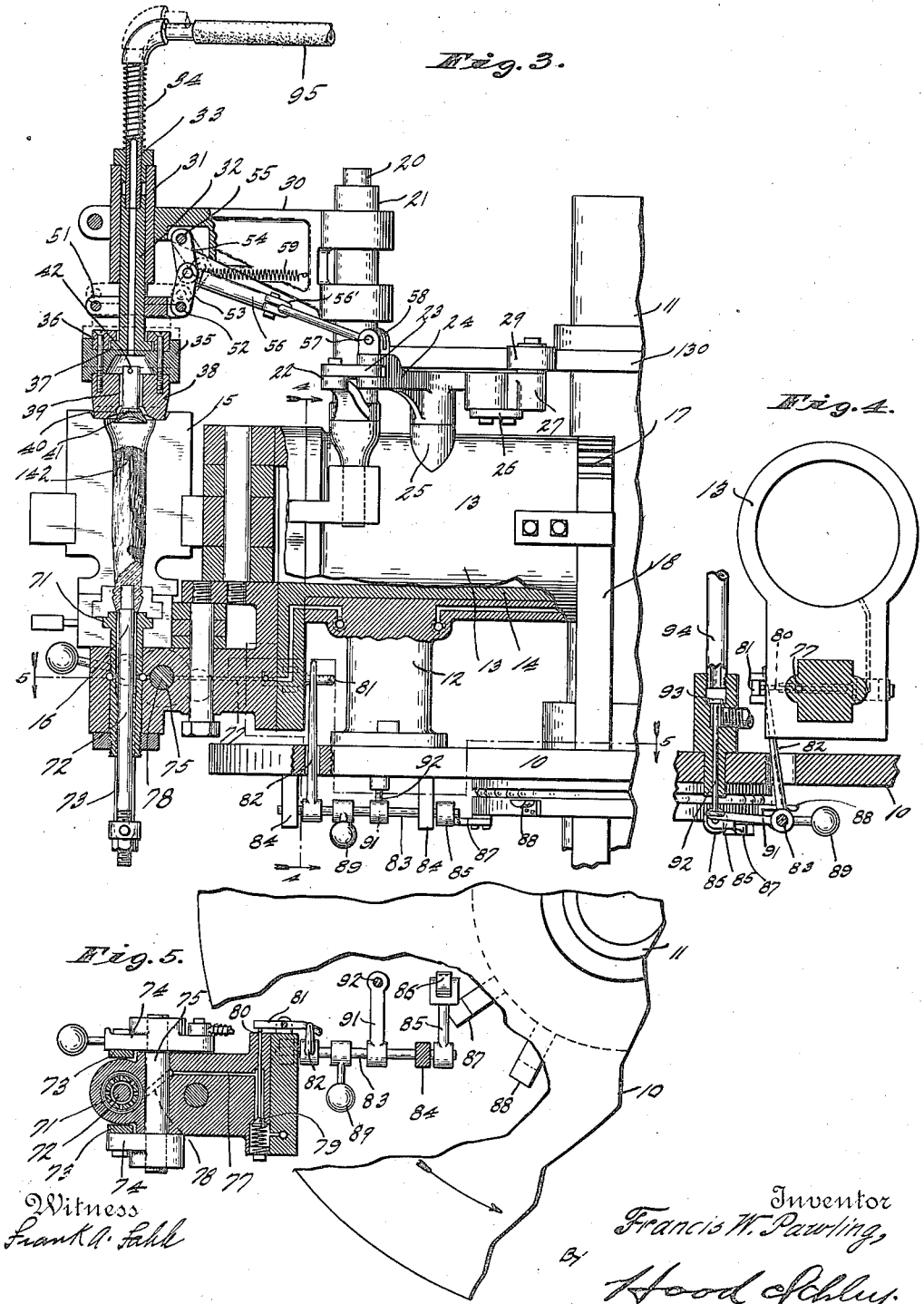

UNITED STATES PATENT OFFICE.

FRANCIS W. PAWLING, OF TERRE HAUTE, INDIANA, ASSIGNOR OF ONE-HALF TO TURNER BROTHERS COMPANY, OF TERRE HAUTE, INDIANA, A CORPORATION OF INDIANA.

GLASS-WORKING MACHINE.

1,177,135.      Specification of Letters Patent.      Patented Mar. 28, 1916.

Application filed June 14, 1915. Serial No. 33,875.

*To all whom it may concern:*

Be it known that I, FRANCIS W. PAWLING, a citizen of the United States, residing at Terre Haute, in the county of Vigo and State of Indiana, have invented a new and useful Glass-Working Machine, of which the following is a specification.

In that type of glass-working machine in which the glass is received in an inverted mold, it is desirable that the glass be compacted into the neck ring before there is any expansion of the parison, and the object of my present invention is to provide means for automatically associating, with the inverted parison mold, a blow head by means of which the compacting pressure may be applied to the glass and which will also form a closure for the upwardly presented bottom of the parison mold during the preliminary expansion of the parison.

The accompanying drawings illustrate my invention.

Figure 1 is a plan of the machine comprising four mold units each equipped with my improvement; Fig. 2 a side elevation of one of the units; Fig. 3 a partial vertical section of one of the units on a larger scale; Fig. 4 a partial section on line 4—4 of Fig. 3; and Fig. 5 a section on line 5—5 of Fig. 3.

In the drawings, 10 indicates a horizontally rotatable table supported upon a suitable standard 11 which may conveniently be part of a transportable carriage of the usual form. Mounted upon table 10 are several glass-working units which are identical. Each of these units comprises a standard 12 which carries a cylinder 13 at its upper end. In this cylinder, which has a horizontal axis, is rotatably mounted a cylinder 14 which carries mold members 15 and neck-forming means 16, as well as mechanism for automatically opening and closing the mold members 15. The cylinder 14 is rotatable about its horizontal axis, so as to invert and revert the mold, by means of a gear 17 and plunger 18. The details of this mechanism, however, form no part of my present invention which resides in the mechanism for applying the air to the glass within the mold.

Erected upon the cylinder 13 is a vertical standard 20 on which is pivoted a sleeve 21 provided with an arm 22. Pivoted to arm 22 is a link 23 which is also pivoted to one arm of a bell crank lever 24 which is pivoted upon a vertical pin 25 carried by the cylinder 13. The other arm of lever 24 is connected to a link 26 which is connected to a lever 27 pivoted at 28 upon cylinder 13 and provided at its free end with a roller 29 which contacts with the periphery of a stationary cam 130 clamped upon standard 11 in such manner that it may be angularly adjusted thereon.

Secured to sleeve 21 so as to partake of its rotation is an arm 30 provided at its outer end with a sleeve 31, the axis of which is vertical and at such distance from standard 20 that it may be swung into alinement with the axis of mold 15. Slidably mounted in sleeve 31 is a tube 32 to the upper end of which is connected a tube 33, said tube being surrounded by a spring 34 which engages the tube and the upper end of sleeve 31 so as to normally hold tube 32 in its upper position, as indicated by dotted lines in Fig. 3. Secured to the lower end of tube 32 is a head 35, the attachment being conveniently by means of an L-shaped collar 36 overlying a circumferential flange 37 at the lower end of tube 32. Secured to the lower end of head 35 is a cap 38 which is provided with a central bore 39 terminating at its lower end in a valve seat 40. The cap 38 is of such form as to be capable of closing the upwardly-presented bottom of the mold 15 and suspended loosely in the bore 39 is a valve 41, said valve being retained in place by a cross pin 42 normally in such position as to give free passage to the air from tube 32 through bore 39. The lower end of valve 40 is so formed that when the glass 142 in the mold 15 is blown upwardly and contacts with the valve 41, it will move upwardly and close seat 40.

Clamped upon tube 32, below sleeve 31, is a collar 51 which may be vertically adjusted upon the tube 32. Pivoted to collar 51 upon a horizontal pivot pin 52 is one link 53, the other link 54 being pivoted at 55 on arm 30. Attached at the knuckle of the toggle 53—54 is one end of a thrust rod 56, the opposite end of which is pivoted at 57 to a yoke 58, the pin of which forms the pivotal connection between link 23 and lever 24. Acting upon the toggle 53—54 to normally break the same, is a spring 59.

In operation, as the table 10 is rotated, roller 29 is held in contact with cam 30 by the action of spring 60 on the knuckle of the toggle formed by link 26 and the short arm of the bell crank lever 24. Through a considerable portion cam 130 is of minimum radius, so that for the major portion of the movement of the table, the arm 30 lies in the position indicated by three of said arms in Fig. 1. When the part 130' of cam 130 is reached, however, lever 27 will be swung outwardly and, acting through link 26, lever 24 and link 23 upon arm 22, will swing arm 30 in a direction opposite to the direction of motion of the table so as to bring sleeve 31 substantially into axial alinement with its mold 15 at a time when the toggle formed by the long arm of lever 24 and link 23 will be nearly straightened, so that further movement of lever 24 will cause practically no movement of arm 30 but, acting upon link 56, will tend to straighten the toggle 53—54 and thus push tube 32 downwardly so as to move cap 38 down upon the open upwardly-presented bottom of mold 15 and hold it in that position until a puff of air under pressure is admitted through tube 32 past valve 41 so as to act upon the upper end of the glass 42 and to compact it into the neck ring mold, and thereafter air is admitted, in a manner now to be described, to expand the glass 42 and drive it upwardly against valve 41 and cap 38.

At the lower end of the neck ring mold (when in the position shown in Fig. 3) there is a tube 71 in which is reciprocably mounted the neck-forming plunger 72 which is vertically reciprocated by means of links 73, 73 connected to arms 74 carried by a rotary shaft 75. An air passage 77 is arranged to deliver air under pressure to the interior of tube 71 through a passage 78 formed through the shaft 75 and arranged to register with the passage 77 when shaft 75 is turned, by a downward movement of the link 73, so as to withdraw the plunger 72 from the neck of the parison. The flow of air to the passage 77 is controlled by a normally closed valve 79, the stem 80 of which is projected into engagement with a lever 81 which may be engaged by a finger 82 carried by a rock shaft 83 journaled in brackets 84 on the under side of table 10. Shaft 83 is provided with a trailing arm 85 provided at its free end with a roller 86 formed to ride first over a stationary cam 87 and then under a stationary cam 88, thus rocking the shaft 83 first in one direction and then in the other. Arm 85 is counter balanced by the weight 89. Attached to shaft 83 is an arm 91 to which is projected a stem 92 of a normally closed valve 93 which controls the flow of air to a pipe 94 which is connected by a flexible pipe 95 with pipe 34.

In operation, the rotation of table 10 brings the roller 86 into contact with the cam 87 immediately after cap 38 has been applied to the upwardly presented bottom of the mold 15 and this movement opens valve 93 so as to permit a momentary puff of air to pass through pipes 94, 95 and 34 and into the upper end of the mold 15 in a manner already described. Continued rotation of the table brings roller 86 beneath cam 88, thus causing the shaft 83 to rock in the opposite direction, whereupon finger 82 serves to shift lever 81 so as to open valve 79 and admit a momentary puff of air into the neck of the parison so as to swell the parison. After the parison has been formed in the manner described, the roller 29 will reach the tip 130" of cam 130, whereupon cap 38 will be withdrawn upwardly and arm 30 swung away from alinement with mold 15, whereupon the mold will be reverted and the parison withdrawn from the mold. As the mechanism for turning the mold forms no part of my present invention, it is thought to be unnecessary to describe it in detail. The thrust rod 56 is in two lengths, one sliding within the other and provided with a collar 56' which renders the rod effective as a thrusting member just as the toggle formed by arm 22 and link 23 is straightened.

I claim as my invention:

1. In a glass-working machine, the combination with a mold support and an open-ended mold, of a cap for said open end, a carrier for said cap shiftable into and out of position alining the cap with the open end of the mold, an operating member connected with the carrier and the cap to shift the carrier into and out of alined position and to shift the cap into and out of engagement with the mold.

2. In a glass-working machine, the combination with a mold carrier and an open ended mold, a cap for said open end, a carrier for said cap shiftable into and out of position alining the cap with said open end, an operating member, and connections between said operating member, the carrier, and the cap whereby movement of the operating member will first shift the carrier to aline the cap with the mold, then shift the cap into engagement with the mold, then withdraw the cap from the mold and finally shift the carrier from cap alining position.

3. In a glass-working machine, the combination with a mold carrier and open ended mold carried thereby, a cap adapted to close the open end of the mold, a shiftable carrier in which said cap is reciprocably mounted, a toggle forming a connection between said carrier and cap to shift the cap in the carrier, an operating lever, a link connection between said lever and the carrier, and an extensible thrust rod connection between the lever and toggle.

4. In a glass-working machine, the combination with a mold carrier and open ended mold carried thereby, a cap adapted to close the open end of the mold, a shiftable carrier in which said cap is reciprocably mounted, a toggle forming a connection between said carrier and cap to shift the cap in the carrier, an operating lever, a link connection between said lever and the carrier, and a thrust rod connection between the lever and toggle.

5. In a glass-working machine, the combination with a rotary table of a mold carrier mounted on said table, an open ended mold carried by said carrier, a cap movable into and out of engagement with the open end of the mold, a shiftable carrier for said cap in which the cap is reciprocably mounted, an operating member, connections between said operating member, carrier, and cap, a stationary cam, and connections between said cam and operating member, whereby rotation of the table will automatically produce a shifting of the carrier to aline the cap with the open end of the mold, a shifting of the cap into and out of engagement with the open end of the mold, and a shifting of the carrier away from the mold.

6. In a glass-working machine, the combination with an open ended mold, of a blow head associated with the mold, a compressing head associable with the mold, fluid conduits leading to said blow head and presser head, valves arranged to control the flow of fluid through said conduits, a rock shaft, connections between said rock shaft and engaging each of said valves in one direction whereby the rock shaft may be operated in opposite directions to alternately operate the valves, and means for automatically rocking said shaft first in one direction and then in the other.

In witness whereof, I have hereunto set my hand at Terre Haute, Indiana, this 9th day of June, A. D. one thousand nine hundred and fifteen.

FRANCIS W. PAWLING.